United States Patent [19]

Icking et al.

[11] 4,452,268

[45] Jun. 5, 1984

[54] CLEANING APPARATUS FOR MILK CONVEYING PATHS IN ANIMAL MILKING MACHINES

[75] Inventors: Friedrich Icking, Oelde; Heinrich Bücker, Langenberg, both of Fed. Rep. of Germany

[73] Assignee: Westfalia Separator AG, Oelde, Fed. Rep. of Germany

[21] Appl. No.: 773,174

[22] Filed: Mar. 1, 1977

[30] Foreign Application Priority Data

Mar. 2, 1976 [DE] Fed. Rep. of Germany ..... 26085858

[51] Int. Cl.³ .................. B08B 3/04; F16K 21/16; F16K 21/20
[52] U.S. Cl. .................. 137/240; 73/298; 73/302; 119/14.18; 134/57 R; 134/100; 134/171 R; 137/433; 222/133
[58] Field of Search .............. 137/237, 238, 423, 433, 137/240; 222/133, 145, 67; 119/14.18; 73/298, 302, 863.83, 863.84, 864.34, 864.35; 134/56 R, 57 R, 100, 101, 166 R, 171

[56] References Cited

U.S. PATENT DOCUMENTS

| | | | |
|---|---|---|---|
| 1,861,886 | 6/1932 | Slough | 73/302 |
| 2,695,626 | 11/1954 | Riche | 137/433 |
| 2,829,657 | 4/1958 | Bender | 134/166 R |
| 3,089,508 | 5/1963 | Schulze et al. | 137/433 |
| 3,119,401 | 1/1964 | Merritt et al. | 134/57 R |
| 3,224,413 | 12/1965 | Patterson | 119/14.18 |
| 3,229,854 | 1/1966 | Turnquist | 222/133 |
| 3,273,514 | 9/1966 | Bender | 119/14.18 |
| 3,310,061 | 3/1967 | Bender | 119/14.18 |
| 3,406,870 | 10/1968 | Arneson | 222/67 |
| 3,461,845 | 8/1969 | Peterson | 119/14.18 |
| 3,881,328 | 5/1975 | Kleimola et al. | 134/100 |
| 4,328,820 | 5/1982 | Serur | 137/433 |

*Primary Examiner*—George L. Walton
*Attorney, Agent, or Firm*—Peter K. Kontler

[57] ABSTRACT

Apparatus for admitting a cleaning agent into the vacuum line of an animal milking installation has a reservoir the lower portion of which communicates with an intake portion of the vacuum line, a metering device having a vessel which is installed in the upper portion of the reservoir, valved conduits which connect the vacuum line with a source of water and with the upper part of the vessel, a source of cleaning agent which is connected to and admits into the vessel cleaning agent when the vessel is connected to the vacuum line, a buoyant valve element which floats on the supply of cleaning agent in the vessel and seals the vessel from the vacuum line when the supply of cleaning agent in the vessel rises to a predetermined level, and a valve which allows the supply of cleaning agent to flow into the reservoir when the pressure differential between the interior of the vessel and the reservoir decreases to a predetermined value subsequent to sealing of the vacuum line from the interior of the vessel. The pressure differential decreases owing to the provision of a flow restricting orifice which connects the interior of the vessel with the surrounding atmosphere or with the interior of the reservoir.

25 Claims, 5 Drawing Figures

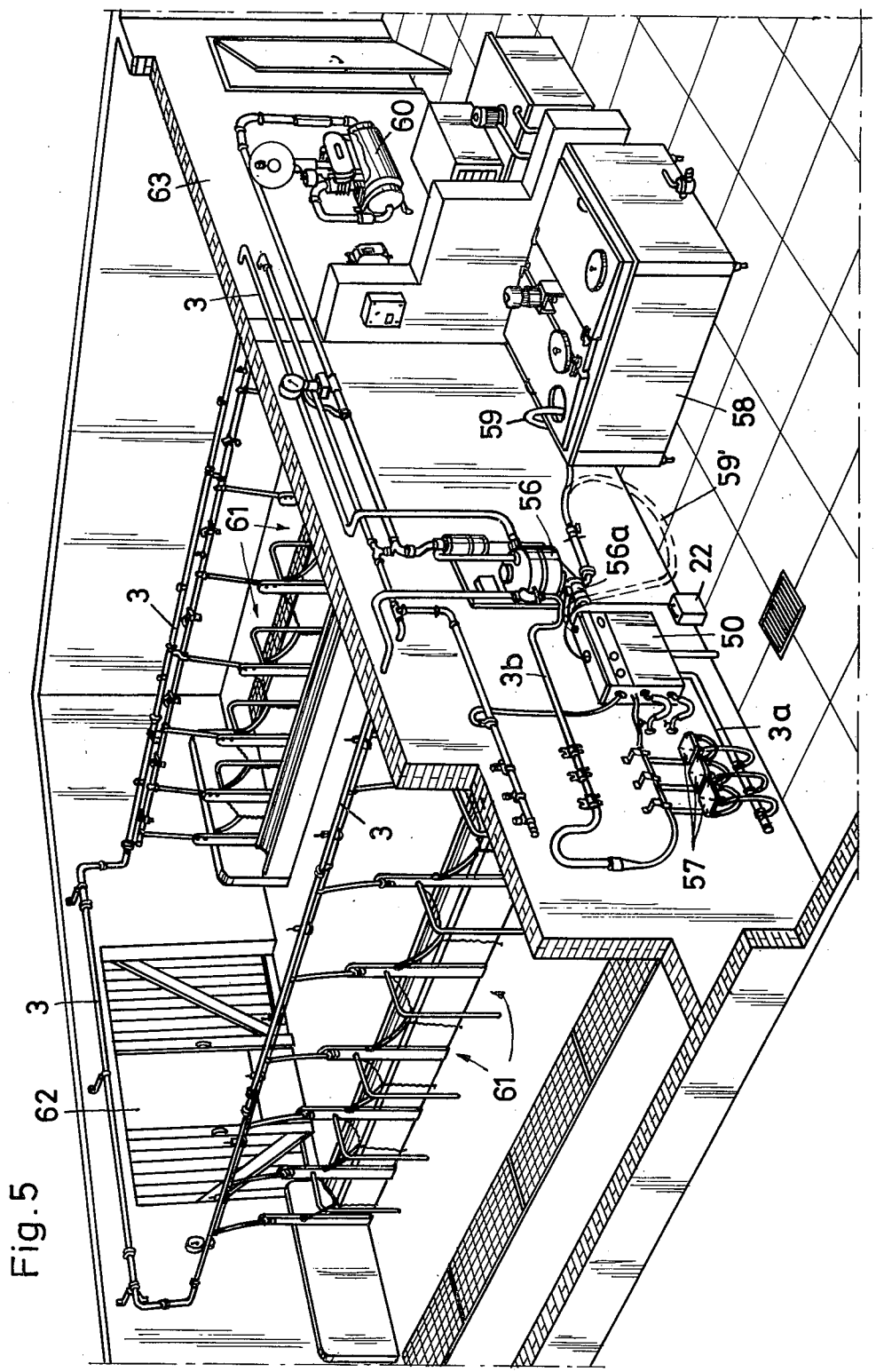

CLEANING APPARATUS FOR MILK CONVEYING PATHS IN ANIMAL MILKING MACHINES

BACKGROUND OF THE INVENTION

The present invention relates to animal milking machines or installations in general, and more particularly to improvements in apparatus or units which are used for cleaning, rinsing, flushing and/or sterilizing the milk conveying paths in such machines.

German Offenlegungsschrift No. 1,692,327 discloses a cleaning unit wherein a housing contains a vessel for a cleaning agent, a heating device for cleaning agent and several conduits containing valves whose operation is regulated by a programming device. The cleaning agent is admitted into a vacuum line which, together with the associated milking and milk conveying instrumentalities, is rinsed and sterilized in response to circulation of cleaning agent therein. The admission of cleaning agent into the vessel is carried out by hand. This presents serious problems, especially if the cleaning agent is of the type tending to form crystals which deposit in the vessel and/or in the conduits to thus constrict or actually clog the passage or passages for circulation of the liquid. Deposition of crystals can take place in response to short-lasting dwell of cleaning agent in the vessel.

It is further known to install in the vacuum line a liquid reservoir (equalizing tank) which insures that the vacuum line can receive and retain varying quantities of liquid. The reservoir is installed close to the vessel for the cleaning agent and its position relative to the vessel must be selected and maintained with a high degree of accuracy. If the level of the reservoir is too high, the vessel receives excessive quantities of dilutant (water) for the cleaning agent and the dissolved or dispersed cleaning agent is likely to overflow the upper edge of the vessel. If the level of the reservoir is too low, the vessel receives insufficient quantities of water. Moreover, manual admission of cleaning agent is time-consuming, especially in large milking installations.

SUMMARY OF THE INVENTION

An object of the invention is to provide a cleaning apparatus or unit which can automatically withdraw optimum quantities of cleaning agent from a suitable source, which is unlikely to cause clogging or constriction of the circuit wherein the cleaning agent is circulated, which can complete a cleaning, rinsing, flushing or sterilizing operation within a short interval of time, and which can be caused to draw, dissolve and circulate the cleaning agent in response to generation of subatmospheric pressure in the vacuum line of the milking machine.

Another object of the invention is to provide novel and improved metering devices for cleaning agent which can be utilized in the above outlined cleaning apparatus.

An additional object of the invention is to provide convertible metering devices which can receive requisite quantities of liquid, pulverulent or granular cleaning agent in automatic response to starting of the cleaning apparatus or which can be filled with such agent by hand.

A further object of the invention is to provide a cleaning apparatus which can be installed in existing milking machines as a superior substitute for conventional cleaning apparatus.

Still another object of the invention is to provide a cleaning apparatus wherein the liquid reservoir invariably remains in an optimum position with respect to the vessel for cleaning agent or vice versa.

An ancillary object of the invention is to provide adjustable metering devices for use in the above outlined cleaning apparatus.

The invention is embodied in a milking machine or installation wherein a vacuum line is connected to means for generating vacuum therein, and more particularly in an apparatus or unit for admitting into the vacuum line a flowable cleaning agent, e.g., a detergent and/or bactericide in solution. The apparatus comprises a reservoir whose lower portion is communicatively connected with the vacuum line, preferably by the interposition of a program-operated shutoff valve which is installed in an intake portion forming part of the vacuum line and extending into the lower portion of the reservoir, a metering device having a preferably upright vessel which extends from above into the upper portion of the reservoir, a source of dilutant or diluent (preferably fresh water), valved conduit means connecting the source and the vacuum line with the upper part of the vessel (the valve means in the conduit means preferably includes a first program-operated shutoff valve between the source of dilutant and conduit means and a second program-operated shutoff valve between the vacuum line on the one hand and the source of dilutant and the vessel on the other hand), a source of cleaning agent connected with the vessel so that cleaning agent flows into the vessel in response to evacuation of air from the vessel by way of the conduit means (i.e., when the conduit means establish an air-evacuating connection between the interior of the vessel and the vacuum line), a first valve provided in the vessel and operative to seal the conduit means from the interior of the vessel when the supply of cleaning agent in the vessel rises to a predetermined level (the first valve may comprise a buoyant valve element which floats on the supply of cleaning agent and rises in the vessel as the supply of cleaning agent in the vessel increases), a throttling orifice in the cover or side wall of the vessel (or analogous flow restrictor means) serving to admit atmospheric air into the vessel and to thus raise the pressure in the vessel subsequent to sealing of the conduit means by the first valve, and a second valve provided in the lower part of the vessel and operative to permit the supply of cleaning agent to flow from the vessel into the reservoir and thence into the vacuum line when the pressure differential between the interior of the vessel and the reservoir (in response to admission of air via flow restrictor means) is reduced to a predetermined value.

The novel features which are considered as characteristic of the invention are set forth in particular in the appended claims. The improved cleaning apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view of a milking machine which embodies the cleaning apparatus of FIG. 1.

DESCRIPTION OF THE PREFERRED EMBODIMENTS

Figure 1:
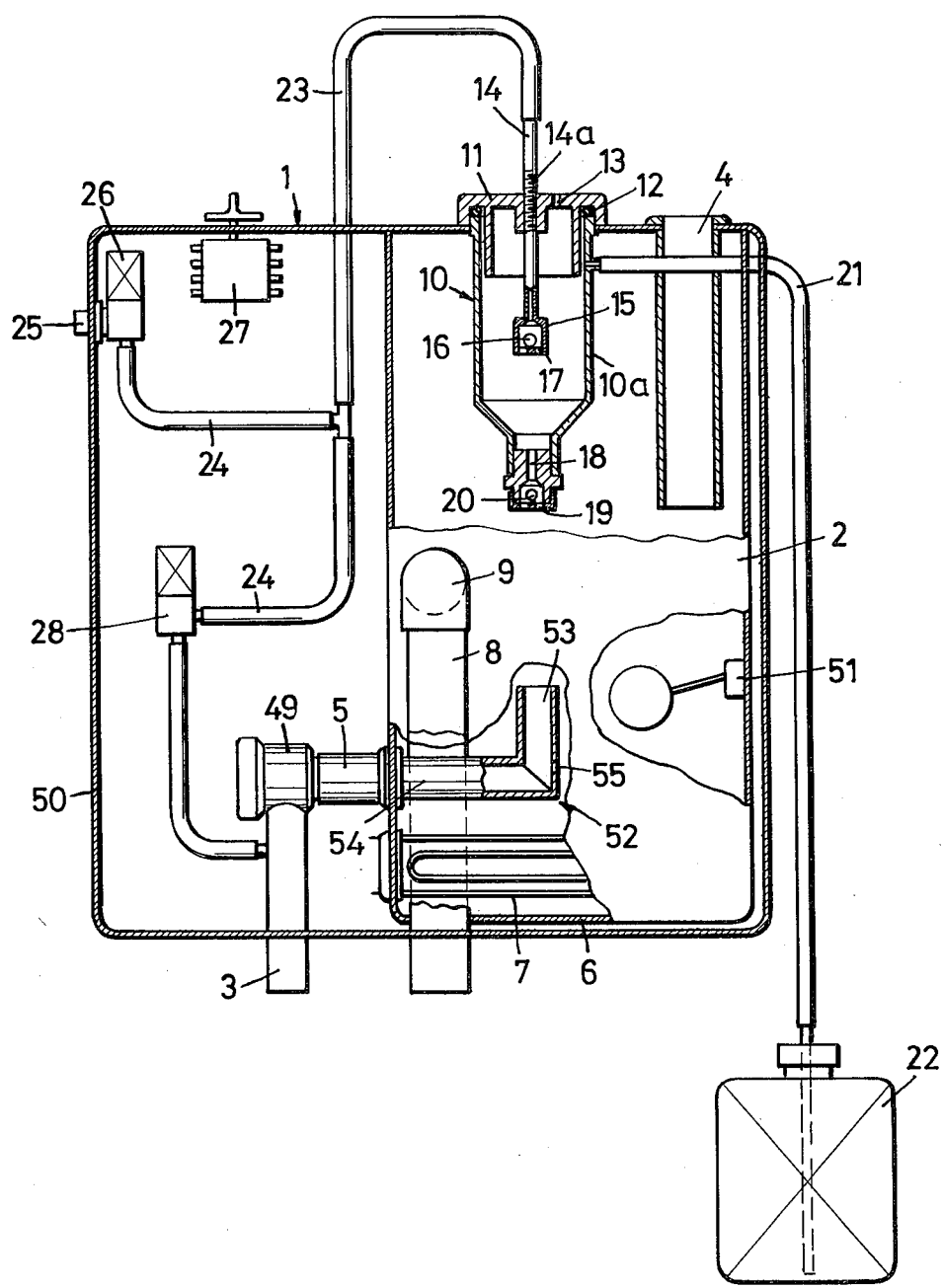
FIG. 1 is a partly elevational and partly sectional view of a cleaning apparatus which embodies one form of the invention and wherein the cleaning agent is automatically sucked into the vessel of the metering device.

Referring first to FIGS. 1 and 5, the milking machine or installation (also called parlor) has two rows of stalls 61 which house cows during milking, and an exit 62 where the cows leave the machine. A partition or wall 63 separates the stalls 61 from a milk room which accommodates a bulk milk tank 58, a suction generating device 60 and a housing 50 for a reservoir or tank 2 and an adjustable metering device 10 for cleaning or flushing agent which is stored in a source 22 here shown as a removable or refillable container. The parts 2, 10 and 50 constitute the components of a cleaning or flushing apparatus 1 for the paths along which milk flows from the teats of cows in the stalls 61 to the tank 58.

The reservoir 2 is installed in an endless vacuum line 3 having an outlet portion 4 which discharges into the reservoir 2 and an intake portion 5 which receives a mixture of dilutant (preferably water) and cleaning agent from the reservoir. The outlet portion 4 is mounted in the top wall of the housing 50 and extends downwardly into the reservoir 2. The intake portion 5 is mounted in the lower portion of the reservoir 2 at a level below the discharge end of the outlet portion 4 but above the bottom wall 6 of the reservoir. The latter contains a set of heating elements 7 which are installed in the space between the bottom wall 6 and the intake portion 5 and serve to heat the mixture of water and cleaning agent which flows into the vacuum line 3 by way of the intake portion 5.

The interior of the reservoir 2 further communicates with the inlet 9 of a conduit 8 serving to discharge the surplus of cleaning agent. The inlet 9 is located at a level above the intake portion 5 but below the metering device 10. The device 10 includes a vessel 10a which is mounted in the top wall of the housing 50 and extends downwardly into the upper portion of the reservoir 2. The upper part of the vessel 10a comprises a removable cover or lid 11 which is accessible at the upper side of the housing 50. A sealing ring 12 is inserted between the cover 11 and the upper edge face of the cylindrical portion of the vessel 10a of the metering device 10. The cover 11 is formed with a throttling orifice or flow restrictor 13 which allows the interior of the vessel 10a to communicate with the surrounding atmosphere. A centrally located opening of the cover 11 receives the end portion of a water-admitting conduit or pipe 14 which is adjustable relative to the vessel 10a by moving it axially up or down. A scale 14a is provided on the pipe 14 to enable an attendant to select the level of the lower end of the pipe 14 within a desired range and to thereby determine, in advance, the quantity of the supply of cleaning agent which can enter the vessel 10a. The pipe 14 reamins in selected position owing to frictional engagement of its external surface with the surface surrounding the central opening of the cover 11.

The lower end portion of the pipe 14 carries an enclosure or cage 15 constituting the body of a valve which further includes a buoyant spherical valve element 16. The bottom wall of the cage or body 15 has one or more ports 17 for admission of water from the pipe 14 into the interior of the vessel 10a.

The bottom part of the vessel 10a is formed with a vertical channel 18 which connects the interior of the vessel with one or more ports 19 serving to admit cleaning agent and water into the interior of the reservoir 2. A spherical valve element 20 is installed in the vessel 10a between the channel 18 and port 19.

The aforementioned source 22 of cleaning agent is connected with the vessel 10a by a supply conduit 21 which can discharge cleaning agent into the upper portion of the vessel at a level above the valve body or cage 15. The cleaning agent which is stored in the source 22 is a liquid.

The pipe 14 is connected with a source 25 of dilutant (water) by a flexible conduit or hose 23 and a further hose or conduit 24. A solenoid-operated shutoff valve 26 is installed between the source 25 and the conduit 24 which latter can admit water directly into the vacuum line 3 in response to opening of a second solenoid-operated shutoff valve 28. The operation of the valves 26, 28 and of a further shutoff valve 49 in the intake portion 5 of the vacuum line 3 is controlled by a programming device 27 mounted in the top wall of the housing 50.

When the cleaning apparatus 1 is in operation, the suction generating device 60 evacuates air from the line 3 so that the pressure in this line is below atmospheric pressure. In order to cause a predetermined quantity of cleaning agent to flow from the source 22 into the vessel 10a of the metering device 10, the programming device 27 is actuated to open the valve 28 so that the vacuum line 3 draws air from the vessel 10a by way of the conduit 23 and pipe 14. Since the pressure in the reservoir 2 exceeds the pressure in the vessel 10a, the valve element 20 rises and seals the lower end of the channel 18 in the bottom portion of the vessel 10a. Cleaning agent is drawn into the vessel 10a via conduit 21 until the upper level of the admitted supply of cleaning agent reaches the valve element 16 and lifts the latter into engagement with the seat at the upper end of the valve body 15, i.e., the cleaning agent causes the valve element 16 to seal the vacuum line 3 from the interior of the vessel 10a. As mentioned above, the pipe 14 is shiftable axially with respect to the cover 11; this enables an attendant to select, in advance, the exact quantity of cleaning agent which enters the vessel 10a before the valve element 16 seals the lower end of the pipe 14.

The throttling orifice 13 in the cover 11 admits atmospheric air into the interior of the vessel 10a so that the pressure in the vessel begins to rise as soon as the valve element 16 closes the lower end of the pipe 14. This causes the valve element 20 to move to the position which is shown in FIG. 1 and to permit cleaning agent to flow from the vessel 10a into the reservoir 2.

In the next step, the programming device 27 opens the valve 26 which allows water to flow into the conduit 24 and thence into the pipe 14 via hose 23. The device 27 opens the valve 49 simultaneously with opening of the valve 26 (the valve 28 is already open) so that the source 25 admits water directly into the vacuum line 3 (via valve 28) and the valve 49 allows the mixture of water and cleaning agent to flow from the reservoir 2 via intake portion 5 and valve 49. The liquid which flows in the line 3 flushes each and every path for the flow of milk from the teats of cows to the tank 58. The manner in which the vacuum line 3 communicates with various hoses, pipes and other conduits for milk forms no part of the invention.

The cleaning apparatus 1 further comprises a level monitoring device or detector 51 here shown as including a float 51a installed in the interior of the reservoir 2. The detector 51 controls the shutoff valve 26 to insure that the admission of water from the source 25 is interrupted when the supply of liquid in the reservoir 2 reaches a predetermined maximum level. The float 51a causes the detector 51 to maintain the liquid level in the reservoir 2 between the inlet 9 of the conduit 8 and the open end of the intake portion 5 of the vacuum line 3. The mixture of liquid and cleaning agent flows through the line 3, enters the reservoir 2 via outlet portion 4, and flows into the intake portion 5 to be recirculated through the line 3.

It has been found that the cleaning action of the apparatus 1 is enhanced if the liquid which circulates in the vacuum line 3 includes one or more spaced-apart plugs or batches which fill the corresponding portions of the line 3 on their way from the intake portion 5 to the outlet portion 4. Such plugs of liquid are drawn through the line 3 by suction which is generated by the device 60 when the cleaning apparatus 1 is in use. The just mentioned plugs of liquid are generated in the following way: The reservoir 2 contains an L-shaped tubular insert or elbow 52 having a horizontal portion or leg 54 which is inserted into the intake portion 5 of the line 3 and a vertical portion or leg 53 which extends upwardly from the leg 54 and whose open upper end is located at the uppermost level of the float 51a, i.e., at that level which the float 51a reaches when the detector 51 closes the solenoid-operated shutoff valve 26 and interrupts the admission of water into the conduit 24. The cross-sectional area of the passage defined by the leg 54 equals that of the intake portion 5. The leg 53 has a port 55 which is located at the level of the horizontal leg 54 and whose cross-sectional area is a small fraction of the cross-sectional area of the passage defined by the intake portion 5 and leg 54.

When the upper level of liquid in the reservoir 2 is below the upper end of the vertical leg 53, the intake portion 5 receives liquid only by way of the relatively small port 55, i.e., the vacuum line 3 receives relatively small amounts of liquid per unit of time. Such amounts are insufficient to form the aforementioned plugs or batches of liquid. As shown in FIG. 5, the milking machine further comprises a holding tank 56 which accumulates some of the liquid that is circulated in the vacuum line 3. When the liquid which accumulates in the holding tank 56 reaches a predetermined maximum level, a float or another suitable device (not shown in FIG. 5) automatically starts the motor of a pump 56a which transfers the contents of the tank 56 into the reservoir 2. This causes the liquid level in the reservoir 2 to rise to and beyond the upper end of the vertical leg 53 of the elbow 52 so that the latter receives a batch of liquid which forms a plug and is caused to pass through the vacuum line 3. The length of such plug may be in the range of 30–50 centimeters.

When the pump 56a is arrested, the holding tank 56 begins to accumulate a fresh supply of liquid which is thereupon transferred into the reservoir 2 to form a second plug which is conveyed through the vacuum line 3. If desired, the formation of liquid plugs can be repeated as often as necessary in order to insure that the cleaning apparatus 1 will carry out a thorough cleaning operation.

FIG. 5 further shows that the partition or wall 63 supports several receptacles 57 for milking instrumentalities (not specifically shown). The receptacles 57 are connected between two exposed branches 3a, 3b of the vacuum line 3 (the branch 3a communicates with the intake portion 5) so that the liquid which enters the line 3 via portion 5 flows through the branch 3a, thereupon through the receptacles 57 (to clean the milking equipment therein) and thence into the branch 3b on its way through the remainder of the line 3 and back into the outlet portion 4.

When the milking machine is in use, the bulk milk tank 58 is connected with the holding tank 56 to receive milk which is supplied by the line 3. When the cleaning apparatus 1 is in use, the hose 59 which connects the tanks 56, 58 is detached from the tank 56 and its end is inserted into the outlet portion 4 (this is shown in FIG. 5 by broken lines, as at 59').

Figure 2:
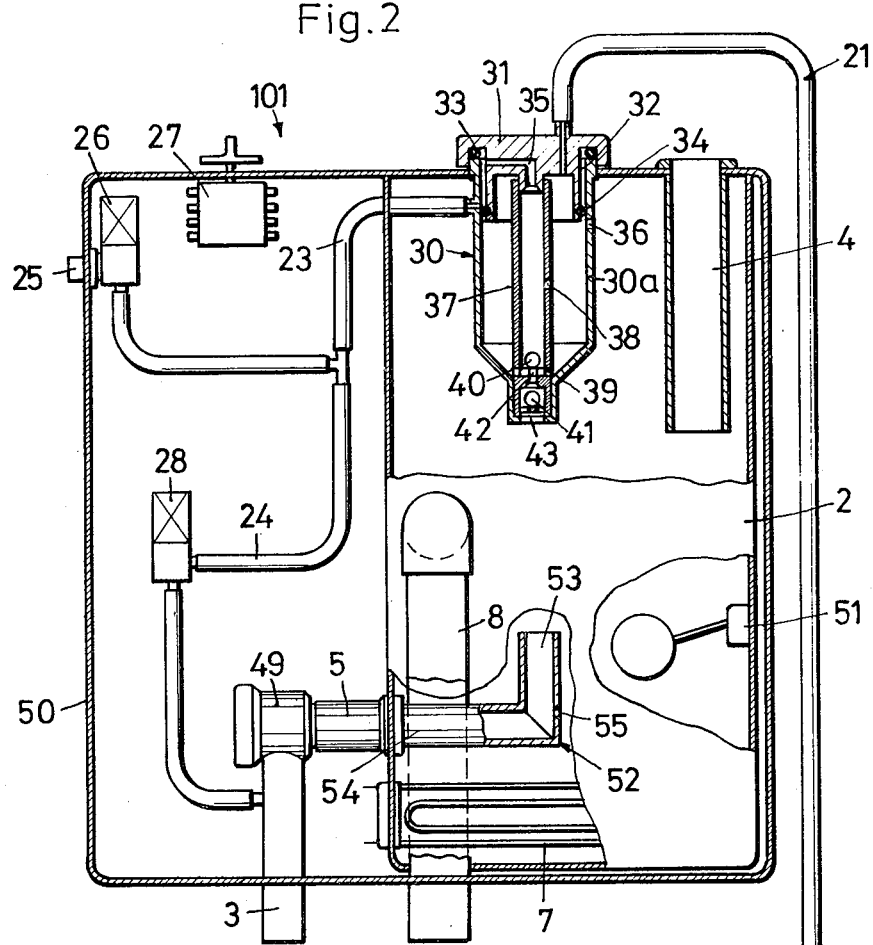
FIG. 2 is a similiar view of a modified cleaning apparatus.

FIG. 2 shows a cleaning apparatus 101 which comprises a modified metering device 30 for liquid cleaning agent. The cylindrical upper portion and the cover 31 of the upper part of the vessel 30a of the metering device 30 define an annular compartment 32 whose upper and lower ends are respectively sealed by O-rings 33, 34 or analogous sealing elements. The discharge end of the conduit or hose 23 communicates with the compartment 32 close to the lower sealing element 34. The compartment 32 is connected with the interior of the vessel 30a by a channel 35 which is machined into the cover 31. A throttling orifice or flow restrictor 36 in the side wall of the vessel 30a establishes communication between the interior of this vessel and the interior of the reservoir 2.

The metering device 30 further comprises an upright tube 37 which is installed in and extends along the full height of the vessel 30a so that its upper end communicates with the channel 35 of the cover 31. A port 38 in the medium portion of the tube 37 establishes communication between the interior of the tube and the interior of the vessel 30a. Additional ports 39 are provided in the lower portion of the tube 37 so as to allow cleaning agent to flow between the interior of the tube and the interior of the vesssel 30a. The tube 37 contains a buoyant spherical valve element 40 which can be lifted by the inflowing liquid to ultimately seal the lower end of the channel 35.

The bottom part of the vessel 30a includes a downwardly tapering conical portion and a cylindrical portion which snugly receives the lower end of the tube 37. This bottom part contains a valve element 41 which can be lifted to seal a discharge opening 42 in the lower end portion of the tube 37. When the valve element 41 assumes the position which is shown in FIG. 2, liquid can flow between the reservoir 2 (via one or more apertures 43 in the bottom part of the body of the valve including the valve element 41) and the interior of the tube 37.

When the cleaning apparatus 101 of FIG. 2 is put to use, the programming device 27 opens the solenoid-operated valve 28 so that the vacuum line 3 draws air from the interior of the tube 37 and vessel 30a via conduit 23, compartment 32 and channel 35. The valve element 41 is thereby caused to rise and to seal the lower end of the discharge opening 42 because the pressure in the reservoir 2 exceeds the pressure in the vessel 30a and tube 37. At the same time, cleaning agent is caused to flow from the source 22 into the vessel 30a by way of the supply conduit 21. The inflowing cleaning agent rises in the vessel 30a and in the interior of the tube 37 so that the valve element 40 moves upwardly toward the cover 31. Once the liquid level in the vessel 30a reaches the port 38, the level of such liquid remains constant in the vessel 30a but the liquid continues to rise in the tube 37 so that the valve element 40 is lifted into sealing engagement with the seat at the underside of the cover 31 and seals the conduit 23 from the tube 37. The throttling orifice 36 admits air from the reservoir 2 into the vessel 30a so that the valve element 41 descends (as soon as the pressure differential between the interior of the vessel 30a and the interior of the reservoir decreases to a predetermined value) to assume the position which is shown in FIG. 2 whereby the cleaning agent can flow into the reservoir by way of the aperture or apertures 43 in the body of the valve including the valve element 41.

The position of the port 38 determines the quantity of cleaning agent which is transferred from the source 22 into the vessel 30a. Thus, by replacing the tube 37 with a tube wherein the port 38 is located at a different distance from the ends of the tube, one can determine, in advance, the quantity of inflowing cleaning agent.

In the next step, the programming device 27 opens the valve 26 so that the source 25 can admit water into the conduits 23 and 24, i.e., into the vessel 30a as well as directly into the vacuum line 3. From there on, the cleaning or flushing operation is carried out in the same way as described in connection with FIGS. 1 and 5.

Figure 3:
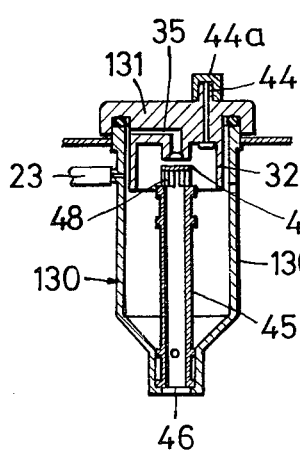
FIG. 3 is an axial sectional view of a metering device which constitutes a first modification of the metering device shown in FIG. 2.

FIG. 3 shows a metering device 130 which can be filled with a cleaning agent by hand. The vessel 130a and the cover 131 are identical with the corresponding elements of the metering device 30 shown in FIG. 2 except that the lower sealing element 34 of FIG. 2 is omitted so that the illustrated end portion of the conduit 23 communicates with the interior of the vessel 130a via lower end of the compartment 32 as well as via channel 35 of the cover 131. The nipple 44 which, in the embodiment of FIG. 2, is connected to the supply conduit 21, is sealed by a plug, cap 44a or bung.

The tube 45 in the vessel 30a of FIG. 3 has an open lower end 46 which communicates with the interior of the reservoir 2 (not shown in FIG. 3) by way of an opening in the bottom portion of the vessel 130a. The upper end of the tube 45 is closed by a transverse wall 47 located immediately above an annulus of apertures 48 which establish communication between the interior of the tube and the interior of the vessel 130a.

The vessel 130a is intended to receive or capable of receiving a supply of pulverulent cleaning agent, e.g., a detergent or a bactericide. The pulverulent agent is introduced upon detachment of the cover 131. The cleaning operation can begin as soon as the cover 131 is returned to the position shown in FIG. 3. The cleaning apparatus which embodies the metering device 130 further comprises a switch (not shown) which maintains the valve 28 (not shown in FIG. 3) in closed position. The programming device 27 is actuated to open the valve 26 so that the conduit 23 admits water into the vessel 130a. The programming device 27 also opens the valve 49 so that the pulverulent cleaning agent, which is dissolved in water flowing into the vessel 130a, overflows through the apertures 48 of the tube 45 and enters the reservoir by way of the lower end 46 of this tube. From there on, the cleaning liquid flows into the vacuum line 3 in the same way as described in connection with FIGS. 1 and 5.

Figure 4:
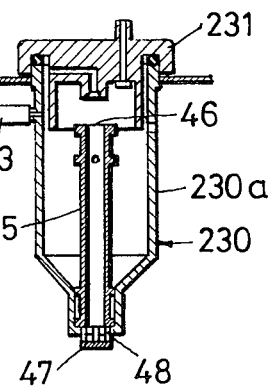
FIG. 4 is an axial sectional view of a metering device which constitutes a second modification of the metering device shown in FIG. 2.

The metering device 230 of FIG. 4 differs from the metering device 130 of FIG. 3 in that the tube 45 is installed in inverted position, i.e., the apertures 48 and end wall 47 are located at the lower end of this tube. The apertures 48 are disposed at a level below the bottom end of the vessel 230a. A metered quantity of liquid cleaning agent is introduced into the vessel 230a while the cover 231 is removed. When the cleaning apparatus including the metering device 230 of FIG. 4 is in use, water flows from the conduit 23 into the vessel 230a to be mixed with cleaning agent and to overflow into the tube 45 by way of the open upper end 46. The cleaning medium then flows into the reservoir and thence into the vacuum line.

When the cleaning operation is completed, the cover 231 is removed and the tube 45 is lifted so that the remnant of water can flow from the lower portion of the vessel 230a into the reservoir.

It will be seen that, by resorting to slightly modified metering devices 130 and 230, one can admit pulverulent or liquid cleaning agent without resorting to the source 22 and conduit 21. In fact, the device 130 or 230 can be used in the same way as the device 30 of FIG. 2 or for manual introduction of cleaning agent. All that is necessary is to remove the lower sealing element 34 of FIG. 2, to disconnect the conduit 21 from the nipple 44, to close this nipple by means of the cap 44a, and to replace the tube 37 of FIG. 2 with the tube 45 of FIG. 3 or 4.

The improved cleaning apparatus exhibits many important advantages. Thus, the likelihood of malfunction is very remote because the position of the reservoir 2 relative to the vessel of the metering device is fixed at all times. Moreover, the admission of selected optimum quantities of cleaning agent into the vessel of the metering device can take place automatically under the action of normal milking machine vacuum, and such vacuum is further utilized to circulate the mixture of diluent and cleaning agent along the milk paths. Still further, and since the operation of various valves is preferably programmed, the period of dwell of cleaning agent in the vessel of the metering device is very short; this reduces the likelihood of deposition of crystals in the vessel and/or in other parts of the cleaning apparatus and milking machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In an animal milking machine wherein a vacuum line is connected with means for generating vacuum therein, apparatus for admitting into said line a flowable cleaning agent comprising a reservoir having an upper portion and a lower portion communicatively connected to said line; a metering device having a vessel extending into said upper portion and including an upper part and a lower part; a source of dilutant; valved conduit means connecting said source and said line with the upper part of said vessel; a source of cleaning agent connected with said vessel so that cleaning agent flows into said vessel in response to evacuation of air from said vessel by way of said conduit means; a first valve provided within said conduit means in said vessel and operative to seal said conduit means from said vessel when the supply of cleaning agent in said vessel rises to a predetermined level which increases the pressure head of the cleaning agent in said vessel; said pressure head being a function of the positioning of said conduit means; flow restrictor means provided in said vessel to admit atmospheric air and to thus raise the pressure in said vessel subsequent to sealing of said conduit means from said vessel; and a second valve provided in said vessel and operative to permit said supply of cleaning agent to flow into said reservoir and thence into said line when the sum of the pressures in the interior of said vessel reaches a predetermined value which is greater than the pressure in said reservoir.

2. Apparatus as defined in claim 1, further comprising first, second and third shutoff valves respectively provided between said reservoir and said line, between said source of dilutant and said conduit means, and in said conduit means between said vessel and said line, and means for opening and closing said shutoff valves in a predetermined sequence, said first shutoff valve being arranged to permit cleaning agent and dilutant to flow from said reservoir into said line in the open position of such shutoff valve, said second shutoff valve being arranged to admit dilutant into said conduit means in the open position of such shutoff valve, and said third shutoff valve being arranged to effect a reduction of pressure in said vessel in the open position of such shutoff valve.

3. Apparatus as defined in claim 1, wherein said first valve comprises a valve element which floats on the supply of cleaning agent in said vessel.

4. Apparatus as defined in claim 1, wherein said second valve is installed in said lower part of said vessel.

5. Apparatus as defined in claim 1, wherein said line has an intake portion communicating with said reservoir and further comprising a shutoff valve installed in said intake portion and means for moving said shutoff valve between open and closed positions to permit the flow of dilutant and cleaning agent from said reservoir into said line in the open position of said shutoff valve.

6. Apparatus as defined in claim 5, wherein said means for moving said shutoff valve includes a programming device.

7. Apparatus as defined in claim 1, further comprising a shutoff valve installed in said conduit means between said line on the one hand and said source of dilutant and said vessel on the other hand, and means for moving said shutoff valve between open and closed positions, said shutoff valve being arranged to establish communication between said line and said vessel and to thus reduce the pressure in said vessel in the open position of such shutoff valve.

8. Apparatus as defined in claim 7, wherein said means for moving said shutoff valve comprises a programming device.

9. Apparatus as defined in claim 1, wherein said upper part of said vessel includes a cover and said conduit means comprises a portion extending through said cover and into said vessel.

10. Apparatus as defined in claim 9, wherein said first valve is mounted on said portion of said conduit means.

11. Apparatus as defined in claim 10, wherein said first valve comprises a cage rigid with said portion of said conduit means and a buoyant valve element installed in said cage and arranged to seal said portion of said conduit means from the interior of said vessel when the supply of cleaning agent in said vessel rises to said predetermined level.

12. Apparatus as defined in claim 10, wherein said portion of said conduit means is movable between a plurality of positions to thereby change the level of said first valve and said predetermined level of cleaning agent in said vessel.

13. Apparatus as defined in claim 10, wherein said flow restrictor means is a throttling orifice in said cover.

14. Apparatus as defined in claim 1, wherein said metering device further comprising an upright tube in said vessel, said conduit means communicating with the upper end of said tube.

15. Apparatus as defined in claim 14, wherein said upper part of said vessel defines an annular compartment which communicates with said conduit means, said upper part having channel means connecting said compartment with said tube.

16. Apparatus as defined in claim 15, wherein said upper part includes an annular portion, a cover and spaced-apart sealing elements intermediate said annular portion and said cover, said compartment being disposed between said sealing elements and said channel means being provided in said cover.

17. Apparatus as defined in claim 14, wherein said tube extends substantially along the full height of said vessel and has at least one port by way of which the supply of cleaning agent can flow from the interior of said vessel into said tube, said first valve being disposed in said tube and including a buoyant valve element which floats on the supply of cleaning agent and seals said conduit means from said tube when the supply of cleaning agent in said tube rises to said predetermined level.

18. Apparatus as defined in claim 17, wherein said lower part of said vessel includes a downwardly tapering conical portion and a cylindrical portion at the lower end of said conical portion, said tube having a lower end snugly received in said cylindrical portion.

19. Apparatus as defined in claim 1, wherein said line has an intake portion in the lower portion of said reservoir and further comprising a conduit for discharge of surplus liquid from said reservoir, said last named conduit having an inlet communicating with said reservoir at a level intermediate said vessel and the intake portion of said line.

20. Apparatus as defined in claim 1, further comprising heating means provided in said lower portion of said reservoir and arranged to heat the dilutant therein.

21. Apparatus as defined in claim 1, further comprising a common housing for said reservoir, said vessel and said conduit means.

22. Apparatus as defined in claim 21, further comprising first, second and third shutoff valves respectively provided between said source of dilutant and said conduit means, between said reservoir and said line, and in said conduit means between said line on the one hand and said source of dilutant and said vessel on the other hand, and programming means for operating said shutoff valves in a predetermined sequence, said shutoff valves and said programming means being installed in said housing, said first shutoff valve being arranged to admit dilutant into said conduit means in the open position of such shutoff valve, said second shutoff valve being arranged to admit dilutant and cleaning agent into said line in the open position of such shutoff valve, and said third shutoff valve being arranged to connect said vessel with said line in the open position of such shutoff valve.

23. Apparatus as defined in claim 1, further comprising a shutoff valve between said source of dilutant and said conduit means, a level detector provided in said reservoir and operative to maintain said shutoff valve in closed position when the liquid level in said reservoir reaches said predetermined level, and means for opening said shutoff valve so that the latter admits dilutant into said conduit means and thence into said vessel.

24. Apparatus as defined in claim 23, wherein said vacuum line has an intake portion and further comprising a tubular insert provided in said reservoir and having a substantially horizontal leg communicating with said intake portion and a substantially vertical leg extending upwardly from said horizontal leg, said vertical leg having an open upper end located at the level at which said detector closes said shutoff valve, the cross-sectional area of the passage defined by said horizontal leg being substantially equal to the cross-sectional area of the passage defined by said intake portion and said insert having a port which admits liquid into said passages and whose cross-sectional area is a fraction of said first named cross-sectional areas.

25. Apparatus as defined in claim 24, wherein said port is provided in said vertical leg.

* * * * *